(12) United States Patent
Nagakura et al.

(10) Patent No.: US 11,705,731 B2
(45) Date of Patent: Jul. 18, 2023

(54) CONTROL DEVICE, CONSIDERATION CALCULATION DEVICE, POWER SYSTEM, AND COMPUTER-READABLE MEDIUM HAVING RECORDED THEREON A PROGRAM

(71) Applicant: FUJI ELECTRIC CO., LTD., Kanagawa (JP)

(72) Inventors: Takayuki Nagakura, Yokohama (JP); Songhao Yin, Hino (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 58 days.

(21) Appl. No.: 17/084,671

(22) Filed: Oct. 30, 2020

(65) Prior Publication Data
US 2021/0159702 A1 May 27, 2021

(30) Foreign Application Priority Data
Nov. 22, 2019 (JP) ................................ 2019-211291

(51) Int. Cl.
*H02J 3/18* (2006.01)
*G05B 19/042* (2006.01)
*H02J 3/38* (2006.01)

(52) U.S. Cl.
CPC ............... *H02J 3/18* (2013.01); *G05B 19/042* (2013.01); *H02J 3/381* (2013.01); *G05B 2219/2639* (2013.01); *H02J 2300/24* (2020.01)

(58) Field of Classification Search
CPC .......... H02J 3/18; H02J 3/381; H02J 2300/24; H02J 2300/22; H02J 3/16; H02J 3/008;
(Continued)

(56) References Cited

U.S. PATENT DOCUMENTS

2005/0286179 A1* 12/2005 Huff ....................... G06Q 10/06
361/20
2018/0097366 A1* 4/2018 Fornage ............ H02J 13/00006

FOREIGN PATENT DOCUMENTS

JP 2004274812 A * 9/2004
JP 2004274812 A 9/2004
(Continued)

OTHER PUBLICATIONS

Office Action issued for counterpart Japanese Application No. 2019-211291, issued by the Japanese Patent Office dated Feb. 12, 2020 (drafted on Feb. 6, 2020).

*Primary Examiner* — Thomas C Lee
*Assistant Examiner* — Charles Cai

(57) ABSTRACT

In order to output sufficient reactive power for voltage stabilization of a utility grid, and calculate an appropriate consideration according to an amount of the output reactive power, is provided a control device for controlling a distributed power source connected to the utility grid, comprising: a range setting unit where an allowable range of reactive and active powers output at normal times is set; an output control unit for controlling the reactive and active powers supplied from the distributed power source to the utility grid within the allowable range set in the range setting unit; and a reception unit for receiving, from a command device in the utility grid, an excess output command indicating that the reactive power exceeding the allowable range should be output, wherein the output control unit is for outputting the reactive power out of the allowable range when the reception unit receives the excess output command.

8 Claims, 11 Drawing Sheets

(58) Field of Classification Search
CPC . H02J 3/48; H02J 3/50; H02J 2300/28; G05B 19/042; G05B 2219/2639; Y02E 10/56; Y02E 40/30; G06Q 10/0631; G06Q 50/06
See application file for complete search history.

(56) References Cited

FOREIGN PATENT DOCUMENTS

| | | | |
|---|---|---|---|
| JP | 2013074668 A | | 4/2013 |
| JP | 2017118782 A | * | 6/2017 |
| JP | 2017118782 A | | 6/2017 |

* cited by examiner

CONTROL DEVICE, CONSIDERATION CALCULATION DEVICE, POWER SYSTEM, AND COMPUTER-READABLE MEDIUM HAVING RECORDED THEREON A PROGRAM

The contents of the following Japanese patent application(s) are incorporated herein by reference:
NO. 2019-211291 filed on Nov. 22, 2019.

BACKGROUND

1. Technical Field

The present invention relates to a control device, a consideration calculation device, a power system, and a computer-readable medium having recorded thereon a program.

Distributed power sources such as solar power generation devices have been widely used. Power generated by a distributed power source is converted into alternating current via a control device such as a power conditioner, to be supplied to a utility grid. Imparting a reactive power control function to the power conditioner suppresses voltage fluctuation of the utility grid caused by a fluctuation of the generated power. For example, a technique has been proposed for predicting and outputting controllable maximum reactive power from the present to a predetermined time later based on predicted maximum power and rated capacity of the power conditioner (see Patent Document 1, for example).

2. Related Art

Patent Document 1: Japanese Patent Application Publication No. 2013-74668

It is desirable that control devices such as power conditioners can output sufficient reactive power for voltage stabilization of a utility grid. It is also desirable that an appropriate consideration be calculated according to an amount of the output reactive power.

SUMMARY

According to a first aspect of the present invention, a control device is provided. The control device may control a distributed power source connected to a utility grid. The control device may include a range setting unit. The range setting unit may be set with an allowable range of reactive and active powers output at normal times. The control device may include an output control unit. The output control unit may control the reactive and active powers supplied from the distributed power source to the utility grid within the allowable range set in the range setting unit. The control device may include a reception unit. The reception unit may receive, from a command device in the utility grid, an excess output command indicating that the reactive power exceeding the allowable range should be output. The output control unit may output reactive power out of the allowable range when the reception unit receives the excess output command.

The range setting unit may be set with a power factor range of the reactive and active powers as the allowable range. The output control unit may output the reactive power out of the power factor range when the reception unit receives the excess output command.

The output control unit may increase the reactive power supplied to the utility grid while maintaining the active power supplied to the utility grid, when the reception unit receives the excess output command.

The output control unit may decrease the active power to increase the reactive power, when apparent power in case of increasing the reactive power in response to the excess output command, exceeds maximum power that can be supplied to the utility grid.

The control device may further include a power conditioner. The power conditioner may receive power from the distributed power source, and output power to the utility grid. Maximum power that can be output by the power conditioner may be larger than maximum power that can be output by the distributed power source.

According to a second aspect of the present invention, a consideration calculation device is provided. The consideration calculation device may include a consideration calculation unit. The consideration calculation unit may calculate, based on a power amount of the reactive power supplied to the utility grid by the control device according to any of the above, a consideration paid to an administrator of the control device. The consideration calculation device may include a power detection unit. The power detection unit may detect the power amount of the reactive power supplied to the utility grid by the control device according to any of the above.

The consideration calculation unit may calculate the consideration based on an excess power amount of the reactive power output exceeding the allowable range.

The consideration calculation unit may calculate the consideration based on an increased power amount obtained by increasing power of the reactive power in response to the excess output command.

The consideration calculation unit may calculate, further based on a consideration paid for the active power, a consideration paid for the reactive power.

According to a third aspect of the present invention, a power system is provided. The power system may include a plurality of the control devices according to any of the above. The power system may include a notification device for notifying each of the control devices of the excess output command.

The notification device may set, based on the active power supplied to the utility grid by each distributed power source, the reactive power to cause each distributed power source to output.

The notification device may preferentially cause a distributed power source that can increase a larger amount of reactive power in a range where the active power supplied to the utility grid is not decreased, to increase the reactive power.

According to a fourth aspect of the present invention, is provided a computer-readable medium having recorded thereon a program that when executed by a computer, causes the computer to perform operations comprising calculating, based on a power amount of reactive power supplied to a utility grid by a control device, a consideration paid to an administrator of the control device. The control device may control a distributed power source connected to the utility grid. The control device may comprise a range setting unit. The range setting unit may be set with an allowable range of reactive and active powers output at normal times. The control device may include an output control unit. The output control unit may control the reactive and active powers supplied from the distributed power source to the utility grid within the allowable range set in the range setting unit. The control device may include a reception unit. The reception unit may receive, from a command device in the utility grid, an excess output command indicating that the reactive power exceeding the allowable range should be output. The output control unit may output the reactive power out of the allowable range when the reception unit receives the excess output command. The program, when executed by a computer, may cause the computer to perform operations comprising: detecting the power amount of the reactive power supplied to the utility grid by the control device. The program may be a program that causes the computer to function as the consideration calculation device according to any of the above.

The summary clause does not necessarily describe all necessary features of the embodiments of the present invention. The present invention may also be a sub-combination of the features described above.

DESCRIPTION OF EXEMPLARY EMBODIMENTS

Hereinafter, the present invention will be described through embodiments of the invention, but the following embodiments do not limit the claimed invention. Moreover, not all combinations of features described in the embodiments are essential to solutions of the invention.

Figure 1:
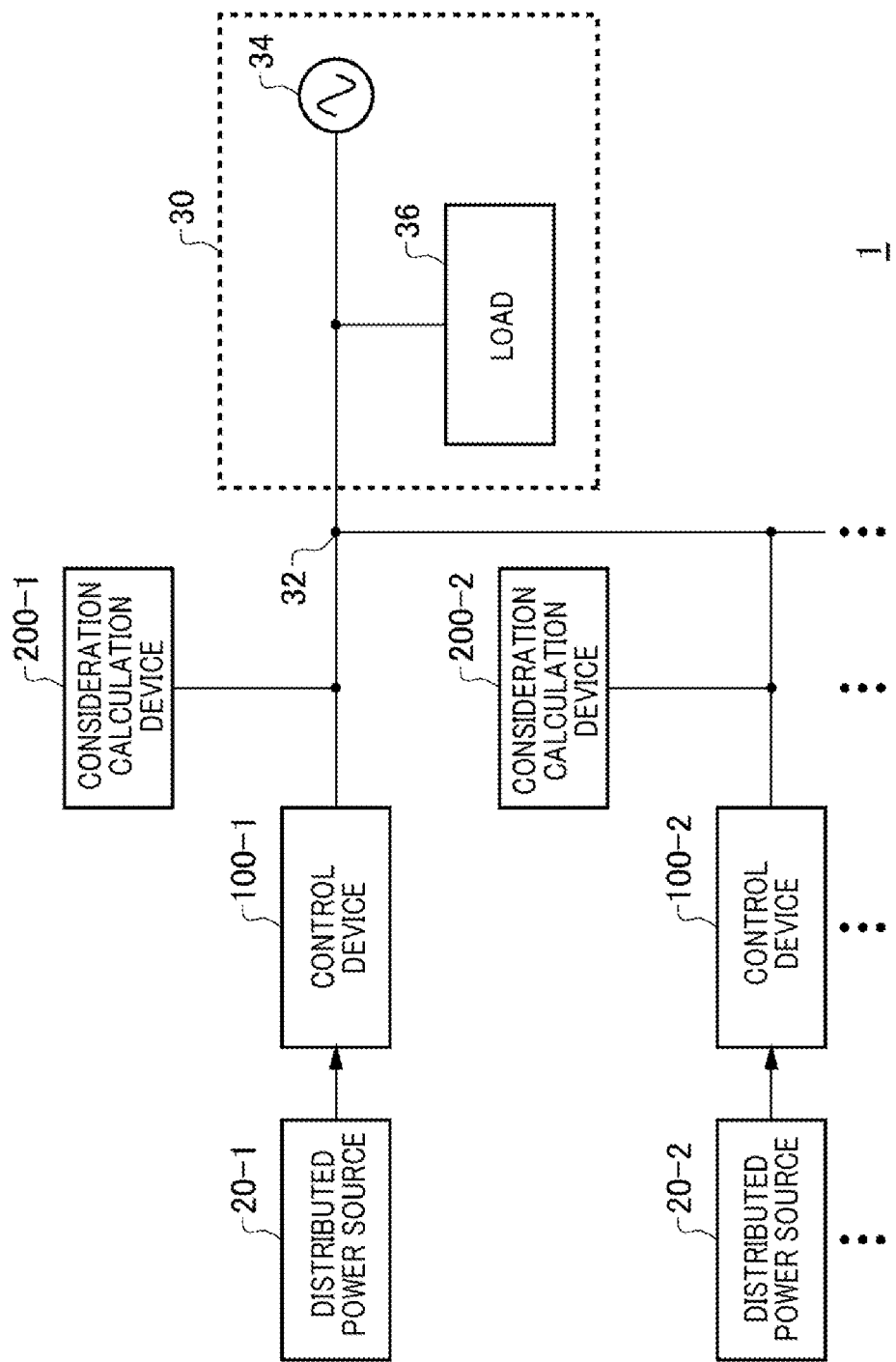
FIG. 1 shows a power system according to one embodiment of the present invention.

FIG. 1 shows a power system 1 according to one embodiment of the present invention. The power system 1 may include distributed power sources 20-1 and 20-2 (may be collectively referred to as a distributed power source 20), control devices 100-1 and 100-2 (may be collectively referred to as a control device 100), and consideration calculation devices 200-1 and 200-2 (may be collectively referred to as a consideration calculation device 200). The number of each configuration is not limited to that shown in FIG. 1.

The distributed power sources 20-1 and 20-2 may be respective power sources such as solar panel-based solar power generation device, wind power generation device, electric vehicle, and fuel cell power generation device. In this example, the distributed power sources 20-1 and 20-2 are solar power generation devices. The distributed power source 20-1 is electrically connected to a utility grid 30 via the control device 100-1. Likewise, the distributed power source 20-2 is electrically connected to the utility grid 30 via the control device 100-2. The output sides of the distributed power sources 20-1 and 20-2 are electrically connected at a linkage point 32. The numbers and types of the distributed power sources 20-1 and 20-2 are not limited to those shown in FIG. 1.

The control devices 100-1 and 100-2 respectively control the distributed power sources 20-1 and 20-2. The control device 100 supplies power generated by the distributed power source 20 to the linkage point 32. The input side of the control device 100-1 is connected to the distributed power source 20-1. The control device 100-1 may be a power conversion device for converting the power generated by the distributed power source 20-1 into power corresponding to the utility grid 30. The input side of the control device 100-2 is connected to the distributed power source 20-2. The control device 100-2 may be a power conversion device for converting the power generated by the distributed power source 20-2 into power corresponding to the utility grid 30. The control device 100 may include a device referred to as a power conditioner, a PCS (power conditioning system), or an inverter.

The output side of the control device 100-1 is connected to the utility grid 30 via the linkage point 32. A transformer may be connected between the control device 100-1 and the linkage point 32. The output side of the control device 100-2 may also be connected to the utility grid 30 via the linkage point 32. The utility grid 30 includes a system power source 34 and a load 36.

The control devices 100-1 and 100-2 are set with an allowable range of reactive and active powers output at normal times. The control devices 100-1 and 100-2 output the reactive power out of the allowable range, when an excess output command indicating that the reactive power exceeding the allowable range should be output, is received from a command device or the like of the power company in the utility grid 30. The configuration of the control devices 100-1 and 100-2 will be described below.

The consideration calculation device 200-1 detects a power amount of the reactive power supplied to the utility grid 30 by the control device 100-1. The consideration calculation device 200-1 calculates, based on the power amount of the reactive power, a consideration paid to an administrator of the control device 100-1. Likewise, the consideration calculation device 200-2 detects a power amount of the reactive power supplied to the utility grid 30 by the control device 100-2. The consideration calculation device 200-2 calculates, based on the power amount of the reactive power, a consideration paid to an administrator of the control device 100-2. Note that the consideration calculation device 200-1 is not limited to this case. The consideration calculation device 200-1 may obtain, from an external device, the power amount of the reactive power supplied to the utility grid 30 by the control device 100-1. Likewise, the consideration calculation device 200-2 may obtain, from an external device, the power amount of the reactive power supplied to the utility grid 30 by the control device 100-2.

The consideration calculation device 200-1 may be provided inside the control device 100-1, or may be communicatively connected with the control device 100-1 as a device different from the control device 100-1. The consideration calculation device 200-2 may be provided inside the control device 100-2, or may be communicatively connected with the control device 100-2 as a device different from the control device 100-2. Moreover, the consideration calculation devices 200-1 and 200-2 may be devices provided in the utility grid 30 managed by the power company. The configuration of the consideration calculation devices 200-1 and 200-2 will be described below.

Figure 2:
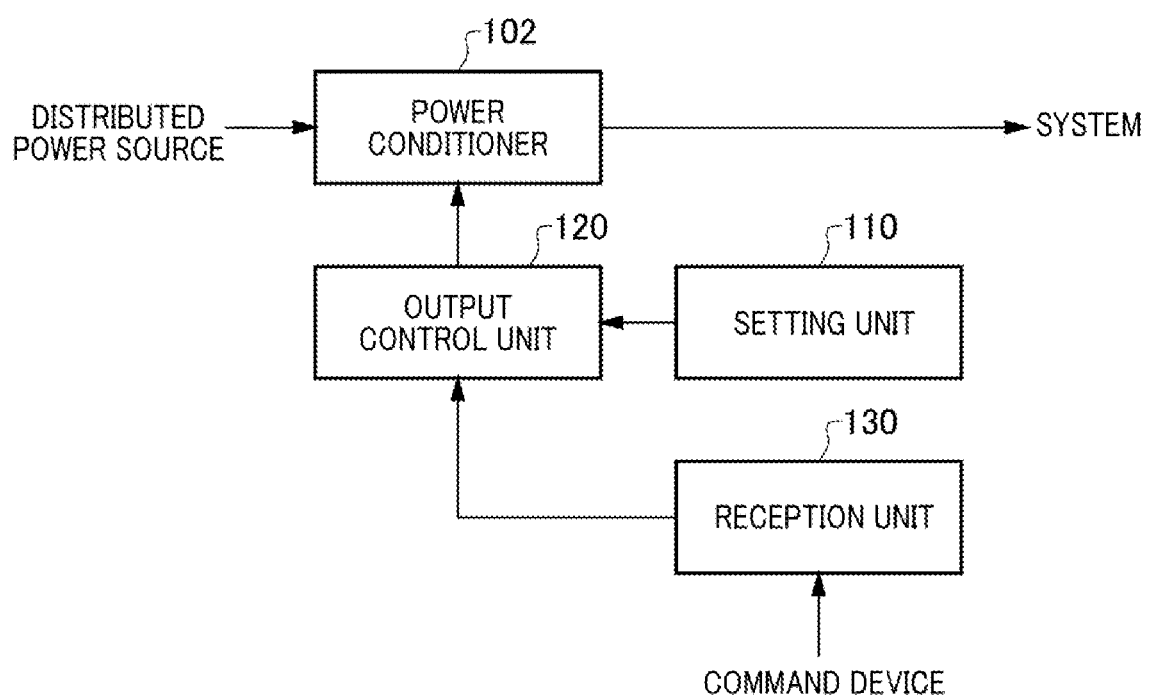
FIG. 2 shows a control device according to one embodiment of the present invention.

FIG. 2 shows a control device 100 according to one embodiment of the present invention. The control device 100 includes a power conditioner 102, a setting unit 110, an output control unit 120, and a reception unit 130. The power conditioner 102 receives power from the distributed power source 20, and outputs power to the utility grid 30. The power conditioner 102 is also referred to as an inverter.

The setting unit 110 is a range setting unit where an allowable range of the reactive and active powers output by the control device 100 at normal times is set. The output control unit 120 controls the reactive and active powers supplied from the distributed power source 20 to the utility grid 30 within the allowable range set in the setting unit 110. The reception unit 130 receives, from the command device in the utility grid 30, the excess output command indicating that the reactive power exceeding the allowable range should be output. The command device in the utility grid 30 may be a control device for controlling the utility grid 30, or may be a terminal device of the administrator managing the utility grid. The reception unit 130 may directly receive the excess output command from the command device, or may receive the excess output command via other notification device or the like.

The output control unit 120 outputs the reactive power out of the allowable range when the reception unit 130 receives the excess output command. Specifically, the output control unit 120 controls the power conditioner to output the reactive power out of the allowable range when the reception unit 130 receives the excess output command.

In general, maximum output power of the distributed power source 20 such as a solar power generation device is set to be larger than maximum power (capacity) that can be output by the power conditioner 102. In consideration of that a situation where the solar power generation device cannot generate the maximum output power due to weather or the like, continues for a long period of time, use of the solar power generation device around the maximum power of the power conditioner 102 can improve economic efficiency. However, in this embodiment, in order to secure power capacity of the reactive power output from the power conditioner 102, maximum power that can be output by the power conditioner 102 may be larger than maximum power that can be output by the distributed power source 20.

Figure 3:
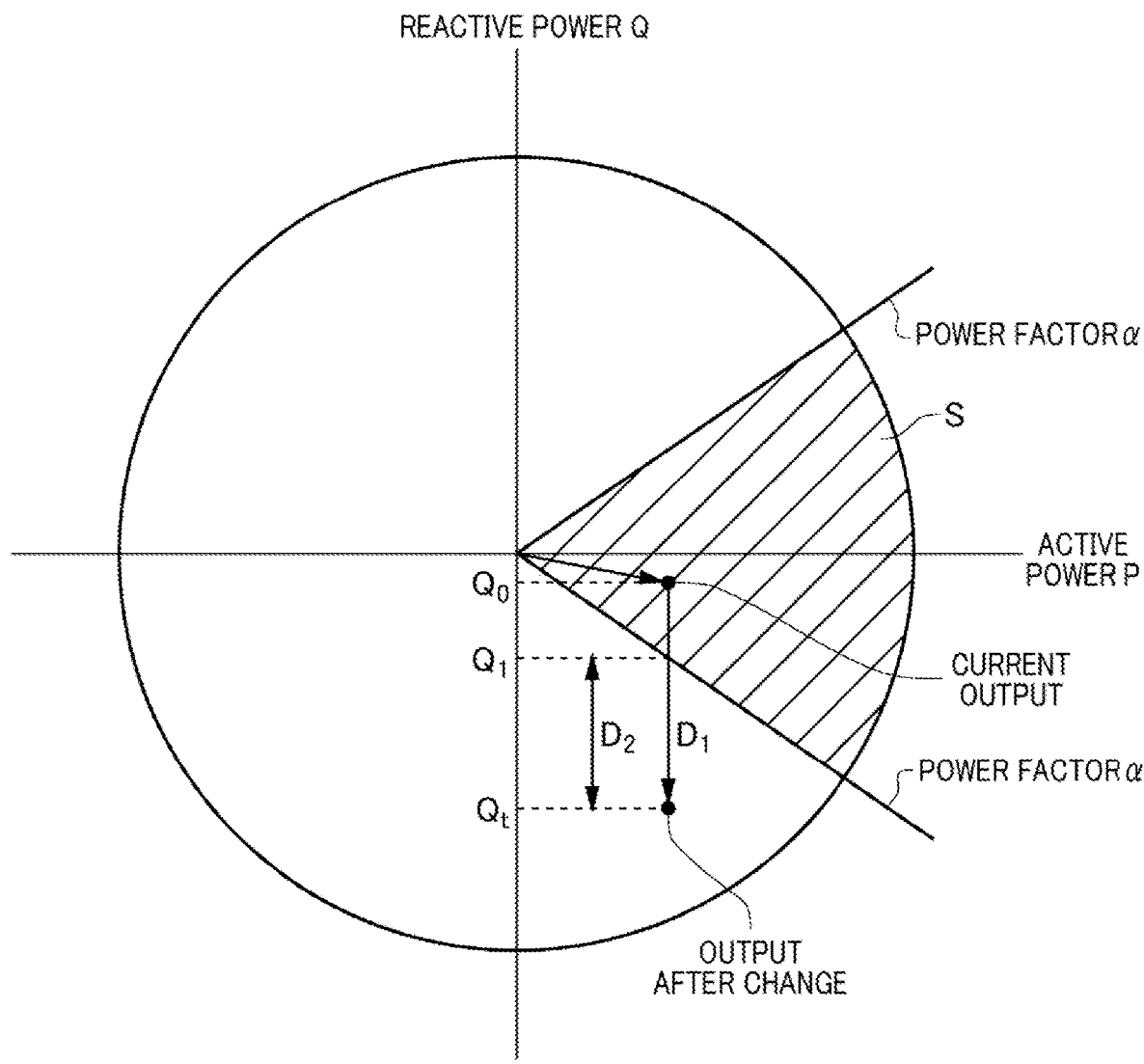
FIG. 3 shows an example of control contents of reactive and active powers by the control device.

FIG. 3 shows an example of control contents of the reactive and active powers by the control device. A circle shown in the FIG. 3 shows maximum power of apparent power that can be supplied to the utility grid 30 by the control device 100. The apparent power is represented by a vector sum of the active and reactive powers. The vertical axis in FIG. 3 indicates the reactive power Q (Var), and the horizontal axis therein indicates the active power P (W). The maximum power of the apparent power that can be supplied to the utility grid 30 by the control device 100 is determined by, for example, semiconductor switch capacity of the power conditioner 102 and the thickness of wiring.

The hatched area indicates an allowable range S of the reactive and active powers output by the control device 100 at normal times. As shown in FIG. 3, a power factor range of the reactive and active powers may be set as the allowable range S. In FIG. 3, the allowable range is determined to be in a range where the power factor is a or more and 1 or less. For example, α is a predetermined value. α may be 0.7 or more and 0.9 or less, or may be 0.8. The power factor is the ratio of the active power to the apparent power.

The output control unit 120 controls the reactive power Q and the active power P supplied from the distributed power source 20 to the utility grid within the allowable range S set in the setting unit 110. In FIG. 3, the reactive power is controlled to $Q_0$ as the current output. The output control unit 120 outputs the reactive power $Q_t$ out of the allowable range S, when the reception unit 130 receives, from the command device in the utility grid 30, the excess output command indicating that the reactive power exceeding the allowable range S should be output.

In this example, the output control unit 120 outputs the reactive power $Q_t$ out of the power factor range when the reception unit 130 receives the excess output command. The reactive power is increased from $Q_0$ to $Q_t$. $Q_0$ indicates the current reactive power before change, and $Q_t$ indicates the reactive power requested by the power company at the time t, that is, the reactive power instructed by the excess output command. The amount of the increased reactive power $D_1$ is $|Q_t-Q_0|$. In an example shown in FIG. 3, the reactive power exceeds the allowable range S in a range of $Q_1$ or more. Excess power $D_2$ of the reactive power output exceeding the allowable range S is $|Q_t-Q_1|$.

The output control unit 120 increases the reactive power Q supplied to the utility grid while maintaining the active power P (referred to as $P_t$) supplied to the utility grid, when the reception unit 130 receives the excess output command. In this case, the reactive power $Q_1$ exceeding the allowable range S is expressed by the following mathematical formula. $P_t$ is the active power maintained before and after change, and α is a power factor.

$$Q_1 = P_t\sqrt{\frac{1}{\alpha^2} - 1} \quad \text{[equation 1]}$$

The consideration calculation device 200 shown in FIG. 1 may calculate a consideration based on a power amount (Var second) obtained by time integral (integration) of the amount of the increased reactive power $D_1$, that is, an increased power amount (Var second) obtained by increasing power of the reactive power in response to the excess output command. When the reactive power is increased, a consumption degree of the control device 100 is increased accordingly. Therefore, calculation of the consideration based on the increased power amount (Var second) can compensate for the consumption of the control device 100 having output the reactive power.

Note that calculation of the consideration is not limited to this case. The consideration calculation device 200 may calculate the consideration based on a power amount (Var second) obtained by time integral (integration) of the excess power $D_2$ of the reactive power, that is, an excess power amount (Var second) of the reactive power output exceeding the allowable range in response to the excess output command. The configuration may be such that within the predetermined allowable range S, the distributed power source 20 (power generation device) contributes to system stabilization as its own responsibility range, while for an excess exceeding the responsibility range, the administrator of the distributed power source 20 receives payment of a consideration corresponding to the excess power amount (Var second).

Figure 4:
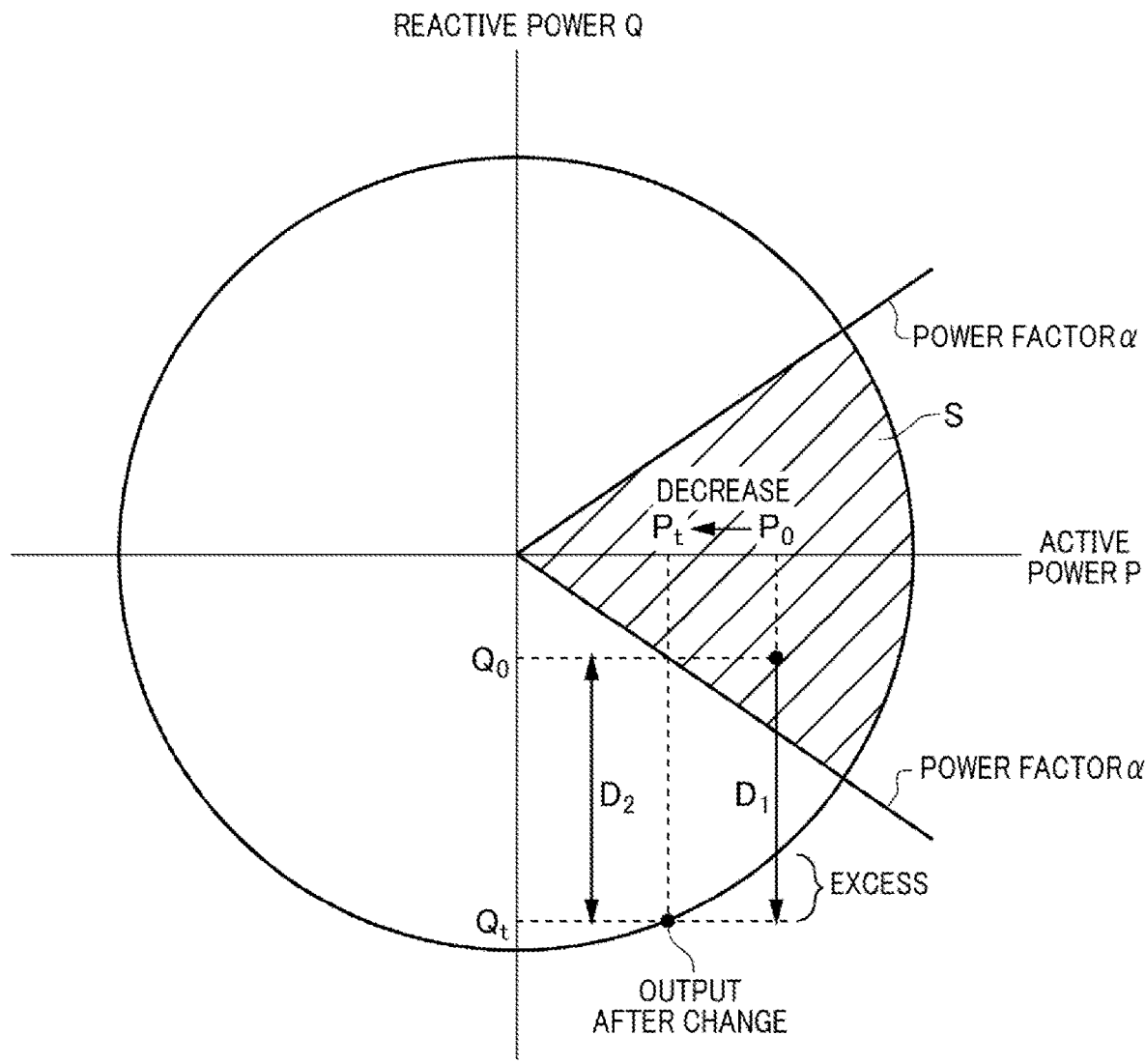
FIG. 4 shows another example of control contents of reactive and active powers by the control device.

FIG. 4 shows another example of control contents of the reactive and active powers by the control device. A circle shown in the FIG. 4 shows the maximum power of the apparent power that can be supplied to the utility grid 30 by the control device 100. The vertical axis in FIG. 4 indicates the reactive power Q (Var), and the horizontal axis therein indicates the active power P (W). The hatched area indicates an allowable range S of the reactive and active powers output by the control device 100 at normal times. As shown in FIG. 4, a power factor range of the reactive and active powers may be set as the allowable range S.

In the case shown in FIG. 4, the output control unit 120 controls the reactive power $Q_0$ and the active power $P_0$ supplied from the distributed power source 20 to the utility grid 30, at normal times within the allowable range S set in the setting unit 110. In this example, the reception unit 130 receives the excess output command indicating that the reactive power exceeding the allowable range S should be output. The apparent power when the output control unit 120 increases the reactive power $Q_0$ to $Q_t$ in response to the excess output command (in case of the amount of the increased reactive power $D_1$), exceeds maximum power that can be supplied to the utility grid 30. The maximum power is determined by wiring capacity, output capacity of the control device (semiconductor switch capacity), and the like.

The output control unit 120 decreases the active power P from $P_0$ to $P_t$ and increases the reactive power Q to $Q_t$, when the apparent power in case of increasing the reactive power in response to the excess output command, exceeds the maximum power that can be supplied to the utility grid 30. Specifically, when the excess output command commands supply of the reactive power $Q_t$, the active power P is decreased to a value equal to or smaller than $P_t$ where the straight line indicating the reactive power $Q_t$ intersects the circle indicating the maximum power of the apparent power. This allows the reactive power based on the excess output command to be supplied to the utility grid 30 within the maximum power of the apparent power. Therefore, voltage fluctuation of the utility grid 30 can be suppressed.

It should be noted that when there are a plurality of control devices 100-1 and 100-2, as shown in FIG. 3, the reactive power may be preferentially increased by the distributed power source 20-1 that can increase a larger amount of reactive power than the other distributed power source 20-2 in a range where the active power supplied to the utility grid 30 is not decreased.

Figure 5:
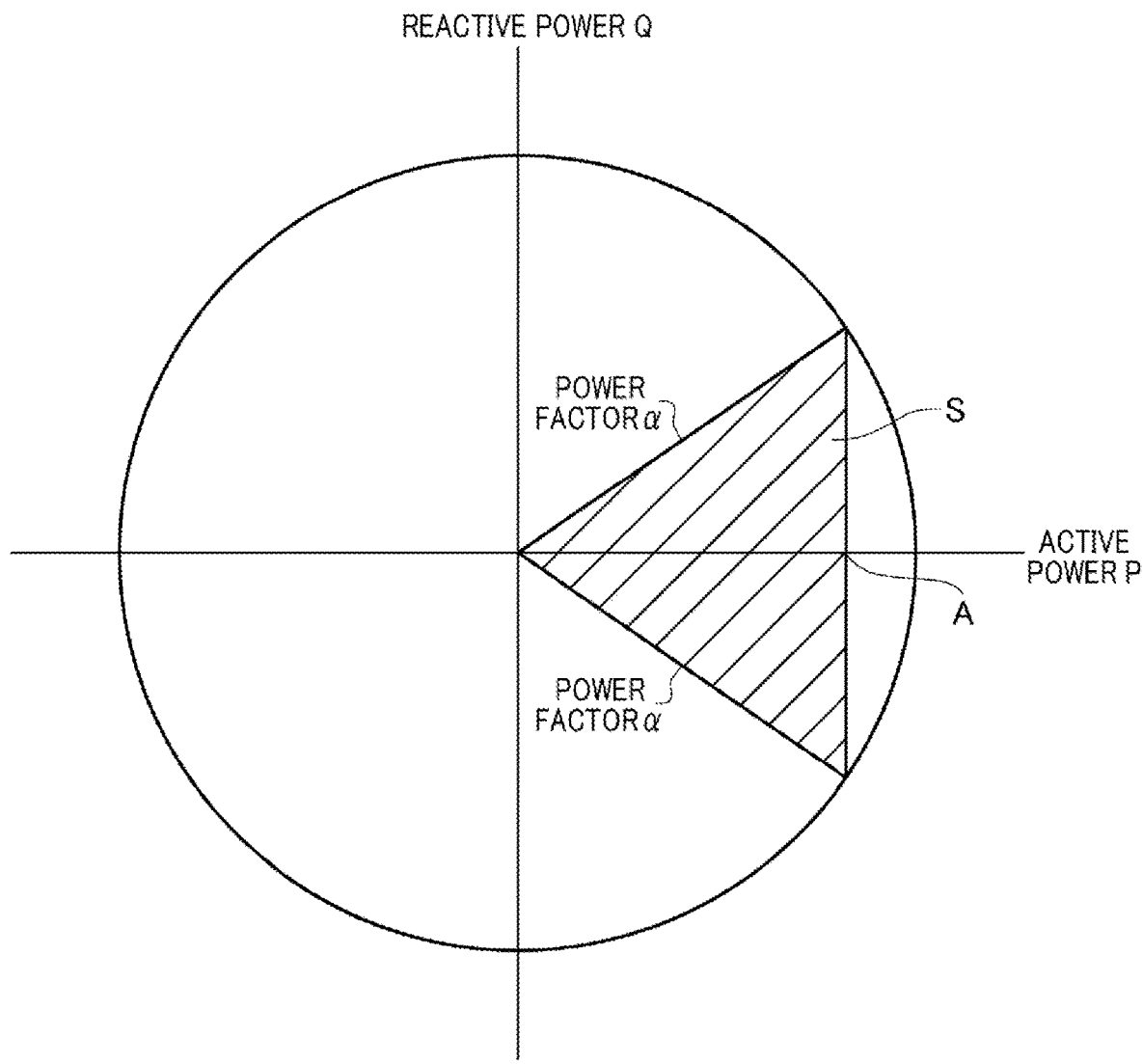
FIG. 5 shows an example of an allowable range for reactive and active powers.

FIG. 5 shows an example of an allowable range for the reactive and active powers. FIG. 3 and FIG. 4 shows the case in which a fan-shaped range where the apparent power is smaller than the maximum power value (meaning that it is inside the circle shown in FIG. 3, FIG. 4) and the power factor is a or more and 1 or less, is set as the allowable range S. However, the allowable range S is not limited to this case. In FIG. 5, a triangle-shaped range where the power factor is a or more and 1 or less and the active power P is A or less (A is a constant predetermined to a value equal to or smaller than the maximum power of the apparent power), is set as the allowable range S.

Figure 6:
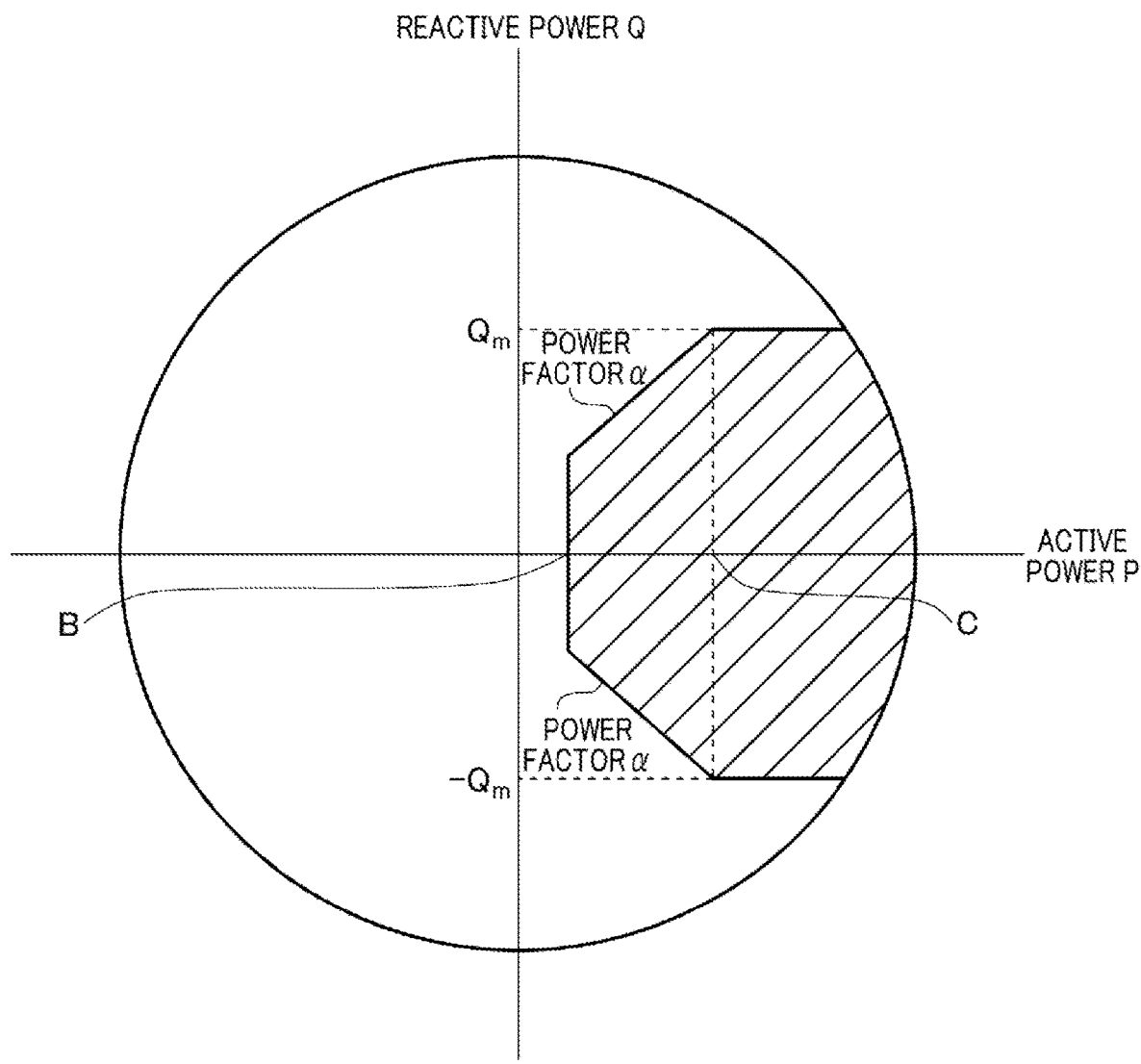
FIG. 6 shows another example of an allowable range for reactive and active powers.

FIG. 6 shows another example of an allowable range for the reactive and active powers. In FIG. 6, a range (shown hatched in FIG. 6) where the power factor is a or more and 1 or less, the active power P is B (note that B is a predetermined constant) or more, and the reactive power is $-Q_m$ or more and $+Q_m$ (note that $Q_m$ is a constant) or less, may be set as the allowable range S. The constant B is a constant predetermined to 0.01 or more times and 0.1 or less times the maximum power of the apparent power, for example, 0.05 times the maximum power of the apparent power. The constant $Q_m$ may be 0.4 or more times and 0.5 or less times, for example, 0.44 times the maximum power of the apparent power. The threshold (absolute value) when the reactive power is negative may be determined to be smaller than the threshold (absolute value) when the reactive power is positive, such that $-Q_m$ is 0.25 times the maximum power of the apparent power and $+Q_m$ is 0.44 times the maximum power of the apparent power.

Even in the allowable ranges as shown in FIG. 5 and FIG. 6, the output control unit 120 can increase the reactive power supplied to the utility grid 30 while maintaining the active power supplied to the utility grid 30, when the reception unit receives the excess output command. Moreover, the output control unit 120 can also decrease the active power to increase the reactive power, when the apparent power in case of increasing the reactive power in response to the excess output command, exceeds the maximum power that can be supplied to the utility grid.

Figure 7:
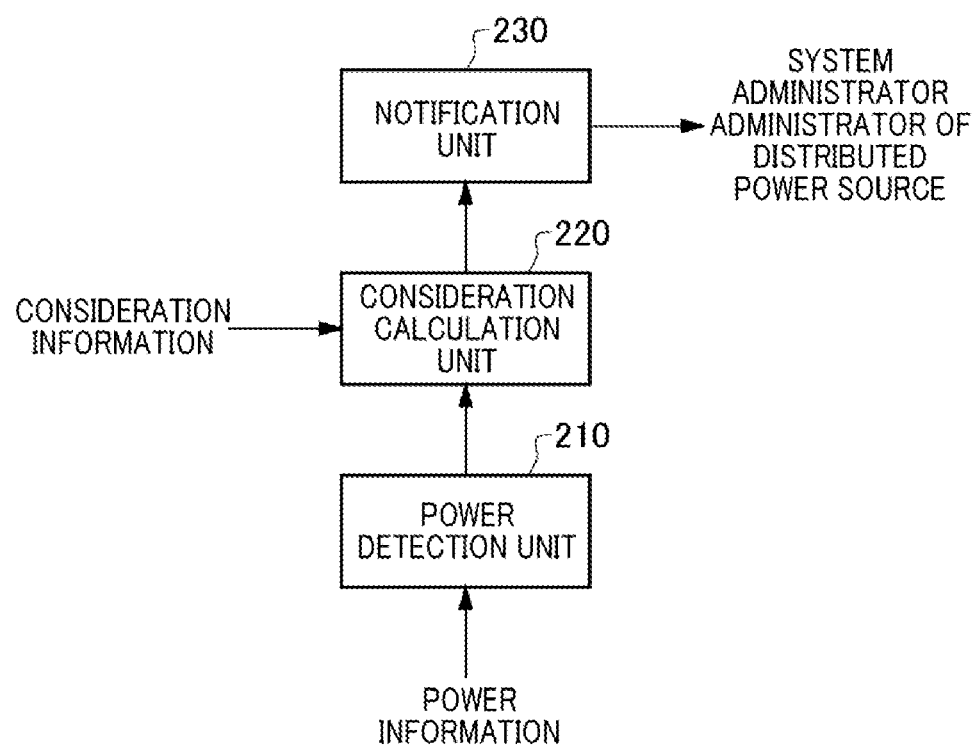
FIG. 7 shows a consideration calculation device according to one embodiment of the present invention.

FIG. 7 shows a consideration calculation device according to one embodiment of the present invention. The consideration calculation device 200 may be provided in the control device 100 or may be provided outside the control device 100. The consideration calculation device 200 includes a power detection unit 210 and a consideration calculation unit 220. The power detection unit 210 detects a power amount of the reactive power (Var second) supplied to the utility grid 30 by the control device 100. The power detection unit 210 may be a power management instrument (watthour meter). Various watthour meters can be employed as power management instruments. Note that the consideration calculation device 200 is not limited to this case. The consideration calculation device 200 may obtain from the external device the power amount of the reactive power supplied to the utility grid 30 by the control device 100. In this case, the consideration calculation device 200 does not need to include the power detection unit 210.

The consideration calculation unit 220 calculates, based on the power amount of the reactive power detected by the power detection unit 210, a consideration paid to an administrator of the control device 100. The consideration calculation device 200 may include a notification unit 230. The notification unit 230 may notify at least one of a terminal device of a system administrator of the utility grid 30 and a terminal device of an administrator of the distributed power source, of the calculated consideration.

The consideration calculation unit 220 may obtain consideration information. The consideration calculation unit 220 may calculate, based on the power amount of the reactive power detected by the power detection unit 210 and the consideration information, the consideration paid to the administrator of the control device 100. The consideration information is, for example, a price per unit of an amount of reactive power. The consideration information may be set in advance. For example, the consideration information may be determined by the power company or the like. Moreover, the consideration information may be derived by the consideration calculation unit 220 obtaining transaction information in a power transaction market of the active power, a power transaction market of the reactive power, or the like.

The consideration information may be set based on a consideration paid for the active power. In this case, the consideration calculation unit 220 calculates, further based on the consideration paid for the active power, a consideration paid for the reactive power. In an example, a unit price of the amount of reactive power may be set to be higher than a unit price of an amount of active power.

By setting the unit price of the amount of reactive power higher than the unit price of the amount of active power, the consideration paid to the administrator of the control device 100 is not decreased even if output of the active power is decreased in order to supply the reactive power Moreover, a future increase in the number of the distributed power source 20 such as a solar power generation device will result in an increase in an amount of the active power to be supplied, and therefore there may be a surplus in the amount of active power over the amount of reactive power. It is possible to cope with such supply and demand relationship by setting the unit price of the amount of reactive power higher than the unit price of the amount of active power. Furthermore, the control device 100 and the distributed power source 20 having contributed to stabilization of the utility grid 30 can be highly evaluated.

The consideration calculation unit 220 may be provided in the utility grid 30. In an example, the consideration calculation unit 220 may be a command device of the power company provided in the utility grid 30. The power detection unit 210 is provided at each of the output end of the control device 100-1 and the output end of the control device 100-2, and the consideration calculation unit 220 may be provided in the utility grid 30. In this case, each power detection unit 210 and the consideration calculation unit 220 are communicatively connected. The consideration calculation unit 220 may receive a measurement result of the power amount of the reactive power from each power detection unit 210.

Figure 8:
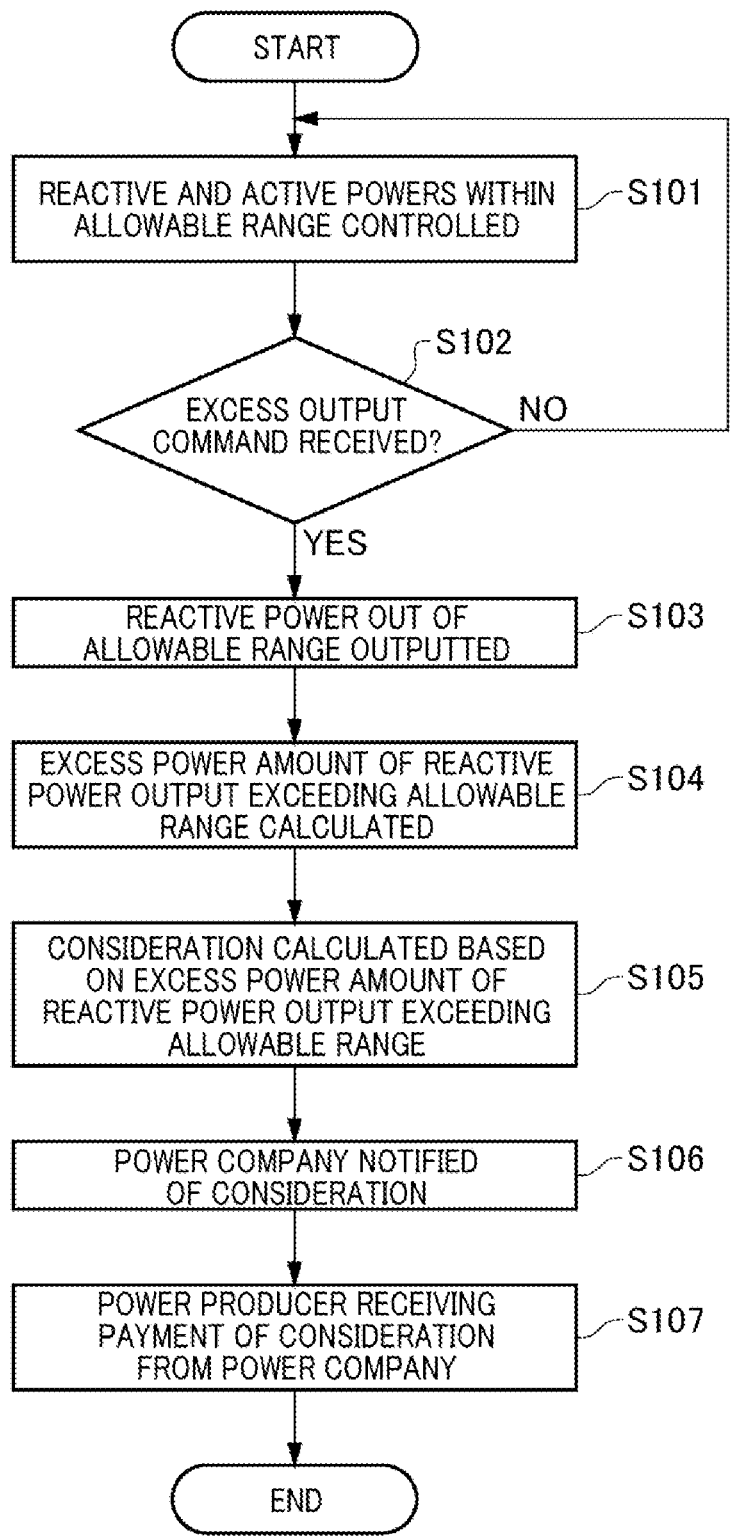
FIG. 8 shows an example of a processing procedure in the power system.

FIG. 8 shows an example of a processing procedure in the power system. As shown in FIG. 3 to FIG. 6, the setting unit 110 of the control device 100 is set with an allowable range of the reactive and active powers output at normal times. For example, the setting unit 110 is set with a power factor range of the reactive and active powers as the allowable range. At normal times, the output control unit 120 controls the reactive and active powers supplied from the distributed power source 20 to the utility grid 30 within the allowable range set in the setting unit 110 (step S101). When the reception unit 130 does not receive, from the command device in the utility grid 30, the excess output command indicating that the reactive power exceeding the allowable range should be output (step S102: NO), the output control unit 120 continues to control the reactive and active powers within the allowable range set in the setting unit 110 (step S101).

When the reception unit 130 receives, from the command device in the utility grid 30, the excess output command indicating that the reactive power exceeding the allowable range should be output (step S102: YES), the output control unit 120 outputs the reactive power out of the allowable range as shown in FIG. 3 (step S103). At this time, the output control unit 120 may increase the reactive power supplied to the utility grid 30 while maintaining the active power supplied to the utility grid 30, when the reception unit 130 receives the excess output command. This can prevent a decrease in an acquisition consideration for the active power.

The power detection unit 210 in the consideration calculation device 200 obtains power information. The power detection unit 210 detects the power amount of the reactive power supplied to the utility grid 30 by the control device 100. The consideration calculation unit 220 calculates, based on a detection result of the power amount from the power detection unit 210, the excess power amount of the reactive power output exceeding the allowable range (step S104). The excess power amount is a power amount (Var second) obtained by time integral (integration) of the excess power $D_2$ (see FIG. 3) of the reactive power output exceeding the allowable range.

The consideration calculation unit 220 calculates, based on the excess power amount of the reactive power output exceeding the allowable range, a consideration paid to each administrator of the control devices 100-1 and 100-2 (step S105). The notification unit 230 notifies the power company of information on the calculated consideration (step S106). Specifically, the notification unit 230 may notify at least one of a terminal device of a system administrator of the utility grid 30 and a terminal device of an administrator of the distributed power source, of the calculated consideration. This allows a power producer to receive payment of a consideration from the power company (step S107). The power producer may be an administrator of the control device 100.

In the processing of FIG. 8, the case is shown where the consideration is calculated, in steps S104 and S105, based on the excess power amount obtained by integration of the excess power $D_2$ (see FIG. 3) of the reactive power output exceeding the allowable range S. Note that the consideration calculation unit 220 may calculate the consideration based on an increased power amount obtained by increasing power of the reactive power in response to the excess output command. The increased power amount is a power amount (Var second) obtained by time integral (integration) of the amount of the increased reactive power $D_1$ (see FIG. 3) obtained by increasing the reactive power in response to the excess output command.

When the reactive power is increased, a consumption degree of the control device 100 is increased accordingly. Therefore, calculation of the consideration based on the increased power amount (Var second) can compensate for the consumption of the control device 100 having output the reactive power.

Figure 9:
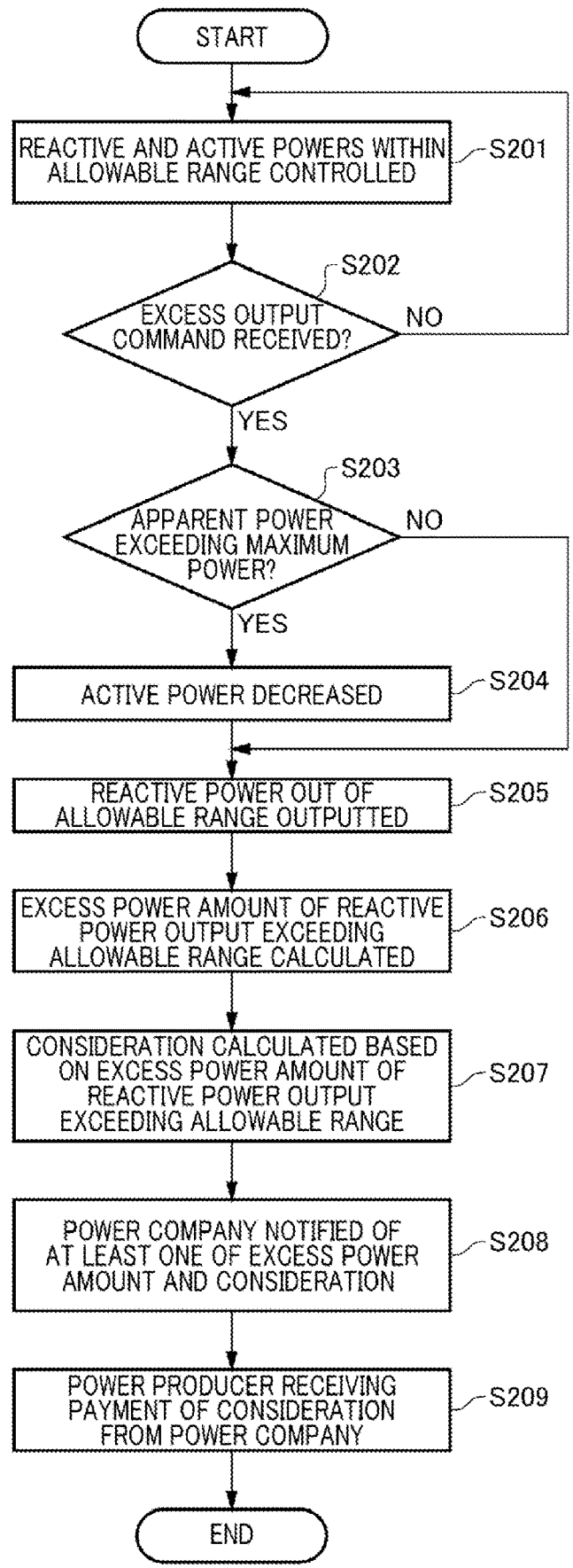
FIG. 9 shows another example of a processing procedure in the power system.

FIG. 9 shows another example of a processing procedure in the power system. The processings of steps S201 and S202 are the same as processings of steps S101 and S102 in FIG. 8. Therefore, a repeated description will be omitted.

The output control unit 120 determines whether the apparent power in case of increasing the reactive power in response to the excess output command, exceeds the maximum power that can be supplied to the utility grid 30 (step S203). When the apparent power in case of increasing the reactive power exceeds the maximum power that can be supplied to the utility grid 30 (step S203: YES), the active power is decreased to increase the reactive power (step S204). Specifically, as shown in FIG. 4, when the excess output command commands supply of the reactive power $Q_r$, the active power P is decreased to a value equal to or smaller than $P_r$ where the straight line indicating the reactive power $Q_r$ intersects the circle indicating the maximum power of the apparent power. This allows the output control unit 120 to supply the reactive power based on the excess output command to the utility grid 30 within a range of the maximum power of the apparent power (step S205).

When the apparent power in case of increasing the reactive power does not exceed the maximum power that can be supplied to the utility grid 30 (step S203: NO), the output control unit 120 outputs the reactive power out of the allowable range (step S205). The processings of steps S205 to S209 are the same as processings of steps S103 to S107 in FIG. 8. Therefore, a repeated description will be omitted.

According to the processings shown in FIG. 9, the reactive power can be increased in response to the excess output command, even if the apparent power exceeds the maximum power when increasing an amount of the reactive power supplied while maintaining the active power. This can contribute to voltage stabilization of the utility grid 30. In this case as well, a consideration for the amount of reactive power can be calculated based on the increased power amount (Var second) of the reactive power or the excess power amount (Var second) of the reactive power. This can compensate for the consumption of the control device 100 having output the reactive power, and give an incentive to the voltage stabilization of the utility grid 30.

Figure 10:
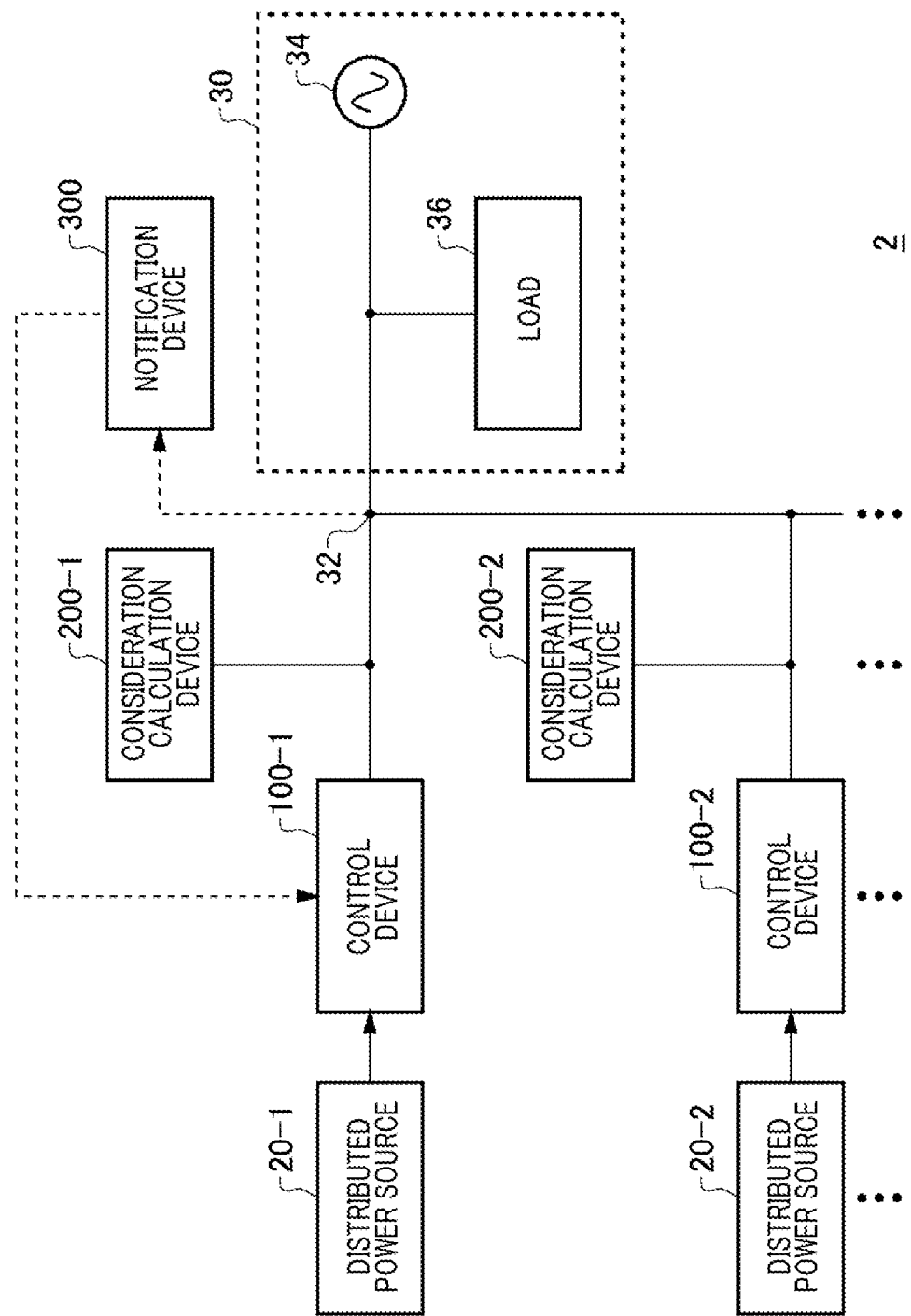
FIG. 10 shows another example of the power system.

FIG. 10 shows another example of the power system. The power system 2 is added with a notification device 300 relative to the power system 1 shown in FIG. 1. The power system 2 includes a plurality of control devices 100-1 and 100-2, and the notification device 300 for notifying each of the control devices 100-1 and 100-2 of the excess output command. The number of the control devices 100-1 and 100-2 may be 3 or more.

The notification device 300 may be a command device, provided in the utility grid, for transmitting the excess output command indicating that the reactive power exceeding the allowable range should be output, or may be a device for totally managing a plurality of distributed power sources. For example, the notification device 300 may be a device of an aggregator who is an operator controlling balance between the power company and demanders, in demand response (DR) that controls an amount of demand of customers and keeps balance between demand and supply of power. When the notification device 300 is not the command device itself, the notification device 300 may receive the excess output command from the command device, and notify the control devices 100-1 and 100-2 of each of the distributed power sources 20-1 and 20-2 of the excess output command.

The notification device 300 may set, based on the active power supplied to the utility grid by each of the distributed power sources 20-1 and 20-2, the reactive power to cause each of the distributed power sources 20-1 and 20-2 to output. For example, the notification device 300 preferentially causes the distributed power source 20-1 that can increase a larger amount of reactive power than the other distributed power source 20-2 within a range where the active power supplied to the utility grid 30 is not decreased, to increase the reactive power. Preferentially causing to increase the reactive power may include allocating, to the distributed power source 20-1 having a higher priority than the other distributed power source 20-2, a larger amount of reactive power increased. A plurality of distributed power sources may be selected in a descending order of the priority to increase the reactive power such that the reactive power from each of the selected distributed power sources 20 is maximized (a state where the apparent power is the maximum power).

The notification device 300 may set the reactive power to cause each of the distributed power sources 20-1 and 20-2 to output, further based on the current reactive power. Moreover, the notification device 300 may set the reactive power to cause each of the distributed power sources 20-1 and 20-2 to output, further based on capacity determined by the thickness of wiring or the like. The notification device 300 may preferentially cause the distributed power source 20 with a power factor close to 1, to increase the reactive power. When the power factor is close to 1, the remaining power for increasing the reactive power is larger than when the power factor is close to 0. Alternatively, the notification device 300 may preferentially cause the distributed power source 20-1 with the current apparent power being smaller than that of the other distributed power source 20-2, to increase the reactive power. Furthermore, the notification device 300 may preferentially cause the distributed power source 20-1 with a predicted value of output fluctuation caused by weather or the like being smaller than that of the other distributed power source 20-2, to increase the reactive power.

The notification device 300 may preferentially cause the distributed power source 20-1 with capacity of connected electric wires being larger than that of the other distributed power source 20-2, to increase the reactive power. This reduces the voltage fluctuation caused by fluctuation of the reactive power. The notification device 300 may preferentially cause the distributed power source 20-1 with the current voltage margin with respect to the voltage allowable range being larger than that of the other distributed power source 20-2, to increase the reactive power.

When a plurality of distributed power sources 20-1 and 20-2, and control devices 100-1 and 100-2 are included, it is possible to set the reactive power caused to be output from each of the distributed power sources 20-1 and 20-2 (the control devices 100-1 and 100-2) to the utility grid 30, based on the various viewpoints mentioned above.

Figure 11:
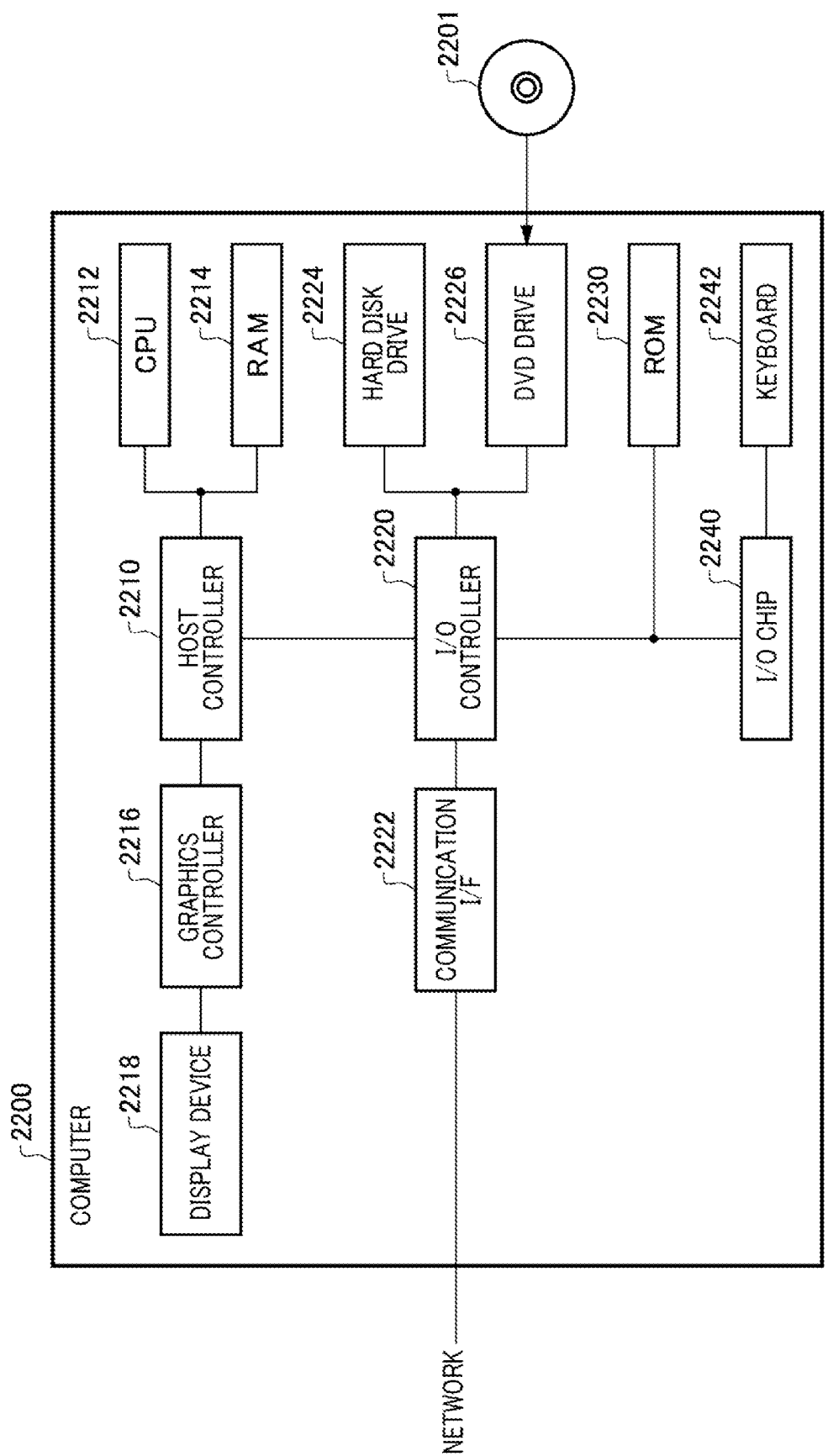
FIG. 11 shows an example of computer 2200 where a plurality of aspects of the present invention may be entirely or partially embodied.

FIG. 11 shows an example of computer 2200 where a plurality of aspects of the present invention may be entirely or partially embodied. FIG. 11 shows an example of hardware configuration of the computer 2200 that functions as the consideration calculation device 200. Moreover, a plurality of computers may work together to function as the consideration calculation device 200.

The computer 2200 according to this embodiment includes a CPU peripheral unit having a CPU 2212, a RAM 2214, a graphics controller 2216, and a display device 2218 interconnected by a host controller 2210; an input/output unit having a communication interface 2222, a hard disk drive 2224, and a DVD drive 2226 connected to the host controller 2210 by an input/output controller 2220; and a legacy input/output unit having a ROM 2230 and an input/output chip 2240 connected to the input/output controller 2220.

The host controller 2210 connects the RAM 2214, and the CPU 2212 and the graphics controller 2216 that access the RAM 2214 at high transfer rates. The CPU 2212 operates based on a program stored on the ROM 2230 and the RAM 2214, and controls each unit. The graphics controller 2216 obtains image data generated by the CPU 2212 or the like on a frame buffer provided in the RAM 2214, and displays it on the display device 2218. Instead, the graphics controller 2216 may include therein a frame buffer for storing the image data generated by the CPU 2212 or the like.

The input/output controller 2220 connects the host controller 2210, and the communication interface 2222, the hard disk drive 2224 and DVD drive 2226 that are relatively high speed input/output devices. The communication interface 2222 communicates with other devices via a network. The hard disk drive 2224 stores thereon a program and data to be used by the CPU 2212 within the computer 2200. The DVD drive 2226 reads a program or data from a DVD-ROM 2201, and provides the program or data to the hard disk drive 2224 via the RAM 2214.

Moreover, relatively low speed input/output devices of the ROM 2230 and the input/output chip 2240 are connected to the input/output controller 2220. The ROM 2230 stores thereon a boot-program to be executed by the computer 2200 at the time of start-up and/or a program dependent on the hardware of the computer 2200, or the like. The input/output chip 2240 connects various types of input/output devices to the input/output controller 2220 via, for example, a parallel port, a serial port, a keyboard port for connecting a keyboard 2242, a mouse port, or the like.

The program to be provided to the hard disk drive 2224 via the RAM 2214 is stored in a recording medium such as the the DVD-ROM 2201 or an IC card, and provided by a user. The program is read out from the recording medium, installed on the hard disk drive 2224 within the computer 2200 via the RAM 2214, and executed in the CPU 2212. The program is installed in the computer 2200, and causes the computer 2200 to function as each configuration of the consideration calculation device 200.

Information processing described in the program is read by the computer 2200, to function as at least a part of the power detection unit 210, the consideration calculation unit 220, and the notification unit 230 which are specific means realized by cooperation between software and the various types of hardware resources, mentioned above. By realizing, with these specific means, operation or processing on information corresponding to an intended use of the computer 2200 in this embodiment, is constructed the consideration calculation device 200 that corresponds to the intended use and is specific.

As an example, if communication is performed between the computer 2200 and an external device or the like, the CPU 2212 executes a communication program loaded onto the RAM 2214, and based on the processing contents described in the communication program, instructs the communication interface 2222 to perform communication processing. Under control of the CPU 2212, the communication interface 2222 reads out send data memorized in a transmission buffer region or the like provided on a storage device such as the RAM 2214, the hard disk drive 2224, or the DVD-ROM 2201 to transmit the data to the network, or writes receive data received from the network into a reception buffer region or the like provided on the storage device. In this way, the communication interface 2222 may transfer send/receive data to/from the storage device in the DMA (direct memory access) scheme, or instead, the CPU 2212 may transfer send/receive data by reading out data from the storage device or the communication interface 2222 of a transfer source, and writing the data into the communication interface 2222 or the storage device of a transfer destination.

Moreover, the CPU 2212 causes all or necessary portions of files, databases, or the like stored in an external storage device such as the hard disk drive 2224 and the DVD drive 2226 (DVD-ROM 2201) to be read into the RAM 2214 by the DMA transfer or the like, and performs various types of processings on the data on the RAM 2214. The CPU 2212 writes the processed data back into the external storage device by the DMA transfer or the like. In such a processing, the RAM 2214 can be considered to temporarily hold contents of the external storage device, and therefore, the RAM 2214, the external storage device, and the like are collectively referred to as a memory, a memory unit, a storage device, or the like in this embodiment. Various types of information such as various types of programs, data, tables, databases in this embodiment are stored on such a storage device, and are subjected to information processing. It should be noted that the CPU 2212 can also hold a part of the RAM 2214 on a cache memory, and perform read and write on the cache memory. In such configuration as well, the cache memory bears a part of function of the RAM 2214, and therefore, the cache memory is also considered to be included in the RAM 2214, a memory, and/or a storage device in this embodiment, unless shown distinguished.

Moreover, the CPU 2212 performs, on data read out from the RAM 2214, various types of processings including various types of operations, information processing, conditional judgement, information search/replacement, or the like described in this embodiment that are specified in an instruction sequence of a program, and writes the data back into the RAM 2214. For example, when performing conditional judgement, the CPU 2212 determines whether various types of variables shown in this embodiment meet condition of such as being larger than, smaller than, equal to or larger than, equal to or smaller than, or equal to other variables or constants, and when the condition is satisfied (or when it is not satisfied), branches to a different instruction sequence or invokes a subroutine.

Moreover, the CPU 2212 can search information stored in files, databases, or the like within a storage device. For example, when a plurality of entries in which attribute values of a second attribute are respectively associated with attribute values of a first attribute are stored in a storage device, the CPU 2212 can search, from among the plurality of entries stored in the storage device, an entry whose attribute value of the first attribute matches a specified condition, and read out the attribute value of the second attribute stored in the entry, thereby obtaining the attribute value of the second attribute associated with the first attribute that meets a predetermined condition.

The programs or modules shown above may be stored in an external recording medium. The recording medium to be used may be, in addition to the DVD-ROM 2201, an optical recording medium such as DVD, Blu-ray (registered trademark) or CD, a magneto-optical recording medium such as MO, a tape medium, flexible disk, a semiconductor memory such as IC card, or the like. Moreover, a storage device such as a hard disk or a RAM provided to a server system connected to a dedicated communication network or the Internet may be used as a recording medium, and a program may be provided to the computer 2200 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

1: power system
20: distributed power source
30: utility grid
32: linkage point
34: system power source
36: load
100: control device
102: power conditioner
110: setting unit
120: output control unit
130: reception unit
200: consideration calculation device 210: power detection unit
220: consideration calculation unit
230: notification unit
300: notification device
2200: computer
2201: DVD-ROM
2210: host controller
2212: CPU
2214: RAM
2216: graphics controller
2218: display device
2220: input/output controller
2222: communication interface
2224: hard disk drive
2226: DVD drive
2230: ROM
2240: input/output chip
2242: keyboard

What is claimed is:

1. A control device configured to control at least one distributed power source connected to a utility grid, wherein the control device comprises:
    a range setting unit configured to set an allowable range of a reactive power and an active power which are output at normal times;
    an output control unit configured to control the reactive power and the active power supplied from the at least one distributed power source to the utility grid within the allowable range set in the range setting unit; and
    a reception unit configured to receive, from a command device in the utility grid, an excess output command indicating that a reactive power exceeding the allowable range should be output,
    wherein the output control unit is configured to output the reactive power exceeding the allowable range when the reception unit receives the excess output command,
    wherein in response to the reception unit receiving the excess power command, the output control unit is configured to increase the reactive power supplied to the utility grid while either (1) maintaining the active power supplied to the utility grid within a range in which an apparent power is less than or equal to a predetermined maximum power value, or (2) adjusting the active power supplied to the utility grid to be within the range in which the apparent power is less than or equal to the predetermined maximum power value, wherein the apparent power is related to a vector sum of the active power supplied to the utility grid and the reactive power supplied to the utility grid; and
    wherein a consideration calculation unit is configured to calculate, using at least one processor, a consideration based on an excess power amount of the reactive power exceeding the allowable range supplied to the utility grid, wherein the consideration is paid to an administrator of the control device.

2. The control device according to claim 1, wherein
    the range setting unit is set with a power factor range of the reactive power and the active power as the allowable range, and
    the output control unit is configured to output the reactive power out of the power factor range when the reception unit receives the excess output command.

3. The control device according to claim 1, further comprising
    a power conditioner configured to receive power from the at least one distributed power source and output power to the utility grid, wherein
    a maximum power that can be output by the power conditioner is larger than a maximum power that can be output by the at least one distributed power source.

4. A control device configured to control at least one distributed power source connected to a utility grid, wherein the control device comprises:
    a range setting unit configured to set an allowable range of a reactive power and an active power which are output at normal times;
    an output control unit configured to control the reactive power and the active power supplied from the at least one distributed power source to the utility grid within the allowable range set in the range setting unit; and
    a reception unit configured to receive, from a command device in the utility grid, an excess output command indicating that a reactive power exceeding the allowable range should be output,
    wherein the output control unit is configured to output the reactive power exceeding the allowable range when the reception unit receives the excess output command,
    wherein in response to the reception unit receiving the excess power command, the output control unit is configured to increase the reactive power supplied to the utility grid while either (1) maintaining the active power supplied to the utility grid within a range in which an apparent power is less than or equal to a predetermined maximum power value , or (2) adjusting the active power supplied to the utility grid to be within the range in which the apparent power is less than or equal to the predetermined maximum power value, wherein the apparent power is related to a vector sum of the active power supplied to the utility grid and the reactive power supplied to the utility grid; and
    wherein a consideration calculation unit is configured to calculate, using at least one processor, a consideration based on an increased power amount obtained by increasing power of the reactive power in response to the excess output command , wherein the consideration is paid to an administrator of the control device.

5. The control device according to claim 1, wherein
    the consideration calculation unit is configured to calculate, using the at least one processor, based on a consideration paid for the active power and a consideration paid for the reactive power.

6. The control device according to claim 4, wherein
    the range setting unit is set with a power factor range of the reactive power and the active power as the allowable range, and
    the output control unit is configured to output the reactive power out of the power factor range when the reception unit receives the excess output command.

7. The control device according to claim 4, further comprising
    a power conditioner configured to receive power from the at least one distributed power source and output power to the utility grid, wherein
    maximum power that can be output by the power conditioner is larger than maximum power that can be output by the at least one distributed power source.

8. The control device according to claim 4, wherein
    the consideration calculation unit is configured to calculate, using the at least one processor, based on a consideration paid for the active power and a consideration paid for the reactive power.

* * * * *